Patented Mar. 10, 1942

2,275,986

UNITED STATES PATENT OFFICE 2,275,986

CONDENSATION PRODUCTS OF ROSIN AND ROSIN ESTERS AND METHOD FOR THE PRODUCTION THEREOF

Arthur L. Osterhof, Newark, Del., assignor to Hercules Powder Company, Wilmington, Del., a corporation of Delaware No Drawing. Application September 22, 1939, Serial No. 296,043

11 Claims. (Cl. 260—97)

This invention relates to rosin condensation products and more particularly to condensation products of rosin with a phenol or rosin esters with a phenol and to a method for the production thereof.

It has long been known that rosin may be quite readily esterified with alcohols. In view of this, the art has also attempted to esterify rosin with other organic hydroxy compounds among the first of these being phenol and naphthol. Esterification of rosin with these compounds did not proceed as smoothly as, for example, with glycerol, and to expedite the reaction, various catalysts were used, among those proposed being boron trifluoride, boric acid, and various mineral acids such as sulfuric and hydrochloric acids.

Most of the prior art efforts were directed to the esterification of rosin with phenols. In all of such reactions heretofore carried out, rosin was used, that is, a compound containing a carboxyl group, since the purpose was to make an esterified rosin.

I have now found a new reaction by which not only rosin, per se, but a rosin ester as well, may be reacted with a phenol to produce new condensation products.

It is an object of this invention to provide condensation products of rosin or rosin esters with a phenol which may be used as such in lacquers, varnishes, and the like, or which may be further treated, as, for example, with a sulfonating agent to produce valuable wetting and emulsifying agents or which may be further reacted with aldehydes.

It is a further object of the present invention to provide a process for condensing rosin or a rosin ester with a phenol.

Other objects of this invention will become apparent from the following description.

The objects of my invention are broadly accomplished by condensing rosin or an ester thereof with a phenol in the presence of an aromatic sulfonic acid.

The condensation reaction is accomplished by heating rosin or a rosin ester with a phenol in the presence of an aromatic sulfonic acid. In general, I have found that the condensation may be carried out using equimolecular proportions of a rosin or rosin ester and a phenol, although it will be understood that the quantities of reactants used need not necessarily be limited to these proportions. The temperature at which the reaction is carried out will desirably be not above about 200° C. and preferably will be within the range from about 100–160° C.

The time of reaction may vary, and in general, will be from 8–16 hours; but it will also be understood that I am not limited to this reaction period. Although the reaction may be carried out with the reactants alone, it will in general be desirable to use a small amount of a non-reactive solvent such as benzol or toluol in order to lower the viscosity of the reaction mixture so as to permit easier mixing. After the condensation reaction has been carried out for the desired time, the excess phenol may be steamed off, or the reaction product or its solution in a suitable solvent may be washed with water. The latter procedure is preferred for recovering the product, since it permits relatively easy removal of both the excess phenol and the acid catalyst. After thorough washing of the product, it may be recovered in any one of the ways well known to the art.

The products obtained in accordance with the method of this invention vary from viscous liquids to solid, resinous substances depending, of course, upon the particular reactants used. They are insoluble in water, but are soluble in the usual organic solvents, such as alcohol, benzol, toluol, and the like, and they are characterized by having a considerably higher melting point and higher viscosity than the original untreated rosin or rosin esters.

The amount of catalyst used on the basis of the total weight of the reactants may vary, but in general, it will be within the range from about 0.5% to about 5% by weight of the combined reactants. When using the higher catalyst ratios, it will often be desirable to carry out the condensation reaction at somewhat lower temperatures than when using smaller amounts of the catalyst.

The condensation reaction in accordance with the present invention is broadly applicable to that class of compounds known as phenols. Among those which I have successfully used for condensation with rosin or rosin esters are phenol, cresol, and the polyhydroxy phenols such as resorcinol and pyrogallol.

In carrying out the process of this invention, wood rosin or gum rosin of any commercial grade may be used. It will also be understood, however, that for the purposes of this invention, instead of wood rosin or gum rosin, the corresponding resin acids may be used in place thereof, and are to be considered the full equivalents of rosin. The term "rosin," as used in the present specification and claims is, therefore, intended to include not only rosin, both wood and gum, but such acids as, for example, abietic, pimaric, sapinic, etc., as well.

In addition to rosin, the process of this invention is also applicable to rosin esters, the term, rosin, being understood in the manner indicated before. Among the rosin esters which may be condensed with phenols are, for example, glycerol abietate (ester gum), ethyl abietate, methyl abietate, and glycol abietate.

The catalyst used in the procedure of this invention may be any of the aromatic sulfonic acids, among which are, for example, para-toluene sulfonic acid, xylene sulfonic acid, and naphthalene sulfonic acid. While, in general, I prefer using para-toluene sulfonic acid, it will be understood that I am not limited solely to this particular sulfonic acid in carrying out the method in accordance with the present invention.

The process of the present invention is more particularly described in the following examples. In these examples, the viscosity measurements shown are relative viscosity determined in the following manner: The tip was cut from a 25 cc. pipette and the pipette was then enclosed in a water jacket to assist in keeping the temperature constant. Tips were then made of various lengths of small bore tubing of different diameters, which were then attached to the end of the pipette. The pipette was filled and the viscosity of the material was measured by noting the number of seconds necessary for the meniscus to travel between two marks, one above and the other below the bulb of the pipette, when supporting the pipette in a vertical position. It was found that two tips were necessary to cover the viscosity range of the products made in accordance with the present invention. The small bore tip was of such size that the figure recorded for water was seven seconds at 25° C. The larger bore tip was of such size that the time for the meniscus to travel between the marks was approximately 18.5 times faster than for the small tip using the same solution in both cases.

*Example I*

One hundred sixty g. (½ mol.) of commercial abietic acid, 47 g. (½ mol.) of phenol, 25 cc. of benzol, and 4 g. of para-toluene sulfonic acid were heated together at 100° C. for 8 hours. The product was thereafter diluted with benzol and washed free from acid with water. The benzol and a trace of free phenol were removed by distillation. The condensation product had the characteristics shown below. For comparison, the characteristics of untreated abietic acid are also shown.

| | Acid No. | Saponification No. | Melting point drop method | Viscosity of 50% solution in alpha-pinene at 25° C. | |
|---|---|---|---|---|---|
| | | | | Small tip | Large tip |
| | | | | Seconds | Seconds |
| Condensation product | 125 | 129 | 120 | | 144 |
| Commercial abietic acid | 170 | 178 | 78 | 105 | |

The remarkable increase in melting point and viscosity over the untreated product is quite apparent.

*Example II*

The procedure shown in Example I was repeated exactly as shown with the exception that the materials were heated together at a temperature from 120–140° C. for 16 hours. The product obtained was recovered in the manner shown, and its characteristics, together with the untreated abietic acid, are shown below:

| | Acid No. | Saponification No. | Melting point drop method | Viscosity of 50% solution in alpha-pinene at 25° C. | |
|---|---|---|---|---|---|
| | | | | Small tip | Large tip |
| | | | | Seconds | Seconds |
| Product of Example II | 105.0 | 113.5 | 126.5 | | 164 |
| Untreated abietic acid | 170 | 178 | 78 | 105 | |

*Example III*

One hundred seventy-five g. (½ mol.) of ethyl abietate, 47 g. (½ mol.) of phenol, and 1 g. of para-toluene sulfonic acid were heated together at a temperature of 120–140° C. for 12 hours. After this reaction period, the mixture was diluted with benzol, washed with water and the condensation product was recovered by distilling off the benzol. The characteristics of the condensation product and the original untreated ethyl abietate are given in the following table:

| | Acid No. | Saponification No. | Iodine value | Acetyl value | Viscosity* at 25° C. large tip |
|---|---|---|---|---|---|
| | | | | | Seconds |
| Product of Example 3 | 4.4 | 15.6 | 156 | 47.9 | 25,000 |
| Properties of untreated ethyl abietate | .4 | 14.2 | 222 | 4 | 110 |

*These viscosities were determined directly without dilution of the solutions.

It will be noted that the condensation reaction has resulted in a product with an enormous increase in viscosity over the original ethyl abietate. It will also be noted that there has been a change in the other characteristics. The decrease in the iodine value indicates that the condensation product is appreciably less unsaturated than the original ethyl abietate.

*Example IV*

One hundred sixty-nine g. of ester gum (glycerol abietate), 25 cc. of toluene, and 50 g. of phenol were fused together and 2 g. of para-toluene sulfonic acid were then added. This reaction mixture was heated at a temperature of 120–140° C. for 16 hours, was thereafter diluted with benzol, and thoroughly washed with water. The product was then recovered by distilling off the solvents and, in comparison with the untreated ester gum, had the characteristics shown below:

| | Acid No. | Saponification No. | Melting point drop method | Viscosity of 50% solution in alpha-pinene at 25° C. | |
|---|---|---|---|---|---|
| | | | | Small tip | Large tip |
| | | | °C. | Seconds | Seconds |
| Product of Example 4 | 15.3 | 38.3 | 131 | | 130 |
| Untreated ester gum | 11.9 | 28.9 | 85 | 380 | |

*Example V*

One hundred sixty g. (½ mol.) of commercial abietic acid, 54 g. (½ mol.) of mixed cresols, 25 cc. of benzol, and 4 g. of para-toluene sulfonic acid were heated together at 120–140° C. for 16 hours. The reaction product was thereafter diluted with benzol and thoroughly washed with water. The benzol was removed by distillation, the temperature used being considerably above the boiling point of the cresols to remove any remaining traces thereof also. The condensation product obtained had an acid number of 112.2, a saponification number of 119.6, a drop melting point of 119° C., and a viscosity of 645 seconds in a 50% solution of alpha-pinene at 25° C., using the small tip. A comparison of these characteristics with those shown for untreated abietic acid in Examples I and II will indicate the changes that have taken place, especially with respect to the melting point and the viscosity. It will be noted that the melting point has been increased by slightly more than 40° C. and the viscosity approximately six fold.

*Example VI*

One hundred sixty g. (½ mol.) of commercial abietic acid, 55 g. (½ mol.) of resorcinol, 25 cc. of xylene, and 4 g. of para-toluene sulfonic acid were heated together at a temperature of 120–140° C. for 16 hours, xylene being added as the viscosity of the solution increased during the period of heating. At the end of the reaction period, the product was diluted with benzol and was thoroughly washed with water to remove the acid condensing agent and any excess resorcinol present. The condensation product was thereafter recovered by distilling off the solvents. The condensation product obtained had an acid number of 112.4, a saponification number of 160, and a drop melting point of 171° C. The viscosity of a 50% solution of this product in alpha-pinene at 25° C. could not be determined because at this temperature a 50% solution was solid. A 25% solution of this product with the same solvent at the same temperature had a viscosity of 140 seconds, using the small tip. The tremendous change in both melting point and the viscosity will be apparent on comparison with the untreated rosin.

*Example VII*

This example is similar to Example VI, except that one-fourth as much catalyst was used in the condensation reaction. 320 g. (1 mol.) of commercial abietic acid, 110 g. (1 mol.) of resorcinol, 50 cc. of toluene, and 2 g. of para-toluene sulfonic acid were heated together at a temperature of 120–140° C. for 16 hours. The product was thereafter diluted, washed, and recovered as shown in Example VI. The condensation product so obtained had an acid number of 116.3, a saponification number of 157, a drop melting point of 162.2° C. As in the case before, a 50% solution in alpha-pinene at 25° C. was solid. A 25% solution of this condensation product in the same solvent at 25° C. had a viscosity, using the small tip, of 115 seconds. It is apparent from this example that the condensation reaction can be satisfactorily carried out with only one-fourth as much of the catalyst without seriously affecting the characteristics of the product.

*Example VIII*

One hundred sixty g. (½ mol.) of commercial abietic acid, 63 g. (½ mol.) of pyrogallol, and 25 cc. of benzol were partially fused, and thereafter 4 g. of para-toluene sulfonic acid were added. The reaction mixture was then heated to a temperature of 120–140° C. for 16 hours, adding more benzol as the viscosity of the solution increased. At the end of the reaction, the product was diluted with benzol, thoroughly washed with water and then recovered in the usual manner by distilling off the benzol. The condensation product so obtained had an acid number of 148, a saponification number of 223, and a drop melting point of 157° C. The viscosity of this product could not be determined, because it was not completely soluble in alpha-pinene.

*Example IX*

One hundred seventy-five g. (½ mol.) of ethyl abietate, 55 g. (½ mol.) of resorcinol, 20 cc. of toluol, and 1 g. of para-toluene sulfonic acid were heated for 16 hours at a temperature from 120–140° C. At the end of this reaction period the mixture was diluted with benzol, thoroughly washed with water to remove the acid catalyst as well as any excess resorcinol, and the product thereafter recovered by distilling off the solvents. The product obtained in this case was a solid resinous substance which had an acid number of 7.8, a drop melting point of 86° C., and a viscosity of 420 seconds in a 50% solution in alpha-pinene at 25° C., using the small tip. The condensation product made is somewhat harder than ordinary rosin which is surprising, considering the fluid nature of the ethyl abietate before treatment.

*Example X*

One hundred sixty g. of gum rosin, 25 cc. of toluene, and 47 g. of phenol were warmed together to complete solution, and 2 g. of para-toluene sulfonic acid were added. This reaction mixture was heated at 120–140° C. for 16 hours, was diluted with toluene, and thoroughly washed with water. The condensation product was recovered by distilling off the toluene.

*Example XI*

One hundred sixty g. of wood rosin, 25 cc. of toluene and 54 g. of cresol were warmed together to complete solution, and 5 g. of xylene sulfonic acid were added. This reaction mixture was heated at 140–160° C. for 16 hours, was diluted further with toluene, and was washed thoroughly with water. The condensation product was recovered by distilling off the toluene.

*Example XII*

One hundred fifty-one g. of abietic acid, crystallized from ethyl alcohol, 25 cc. of toluene and 55 g. of resorcinol were warmed together to complete solution, and 10 g. of naphthalene sulfonic acid were added. This reaction mixture was heated at 140–160° C. for 16 hours, was diluted further with toluene, and was washed thoroughly with water. The condensation product was recovered by distilling off the toluene.

The condensation products of the present invention may thus be made without the presence of the carboxyl group and the reaction of the present invention, therefore, differs from the prior art esterification reactions of phenol and rosin in that the reaction is equally as applicable with esterified rosin as with rosin. While the composition of the products of this invention are not exactly known, they cannot be considered to be esterified rosin products because condensation products are also obtained with rosin esters, that is, rosin which has already been esterified. The condensation products of the present invention are characterized by a marked increase in melting point and viscosity over the untreated rosin or rosin ester, indicating a definite condensation of the rosin or rosin ester with a phenol.

The products of the present invention may be used as such in varnishes, lacquers, etc., and for any other purposes where higher viscosity and higher melting point products may be desirable. They may also be further reacted, for example, with sulfonating agents, or they may be used to react with aldehydes. Treatment of my condensation products with sulfonating agents such as, for example, sulfuric acid or chlorsulfonic acid yields water-soluble sulfonic acids of my condensation products which may be used as such or in the form of alkali metal salts thereof as wetting and emulsifying agents.

In making a sulfonic acid derivative of my condensation product, I may proceed in the following manner: 104 parts by weight of a methyl abietate-phenol condensation product are dissolved in 50 parts by weight of carbon tetrachloride. The solution is heated to 60–70° C., and is sulfonated for 20 minutes by the addition thereto of 32 parts by weight of chlorsulfonic acid, using vigorous agitation. The product of this sulfonation may be obtained as a sodium salt by neutralizing with a cold, dilute solution of caustic soda, allowing it to stand, removing the water layer which separates, and recovering the sodium salt in paste form which may be dried and powdered, and then used as a wetting agent.

The further reaction of my condensation products with an aldehyde may, for example, be carried out as follows: 60 g. of a condensation product such as shown in Example I, 10 g. of formaldehyde and 30 cc. of acetic acid were heated together at 110–130° C. for 16 hours. This reaction product was thereafter cooled and diluted with benzol. After the benzol solution was water washed, the benzol was removed by distillation and the residue heated to 230° C. under reduced pressure. The product obtained had an acid number of 100 and a drop melting point of 180° C. The viscosity of a 50% solution of this product in alpha-pinene at 25° C. with the large tip was 1150 seconds.

It will be understood that the details and examples given hereinbefore are illustrative only and are in no way limiting on my invention as broadly described hereinbefore and in the appended claims.

What I claim and desire to protect by Letters Patent is:

1. A method of producing a condensation product of a phenol and a material selected from the group consisting of rosins and rosin esters which includes heating the said material with a phenol in substantially equimolecular proportions in the presence of an aromatic sulfonic acid at a temperature from about 100° to about 200° C. until a reaction product is obtained having a melting point and viscosity substantially higher than that of the original rosin material.

2. A method of producing a condensation product of a phenol and rosin which includes heating rosin with a phenol in substantially equimolecular proportions in the presence of an aromatic sulfonic acid at a temperature from about 100° to about 200° C. until a reaction product is obtained having a melting point and viscosity substantially higher than that of the original rosin.

3. A method of producing a condensation product of a phenol and rosin which includes heating rosin with a phenol in substantially equimolecular proportions in the presence of para-toluene sulfonic acid at a temperature from about 100° to about 200° C. until a reaction product is obtained having a melting point and viscosity substantially higher than that of the original rosin.

4. A method of producing a condensation product of phenol and rosin which includes heating rosin with phenol in substantially equimolecular proportions in the presence of para-toluene sulfonic acid at a temperature from about 100° to about 200° C. until a reaction product is obtained having a melting point and viscosity substantially higher than that of the original rosin.

5. A method of producing a condensation product of a phenol and a rosin ester which includes heating a rosin ester with a phenol in substantially equimolecular proportions in the presence of an aromatic sulfonic acid at a temperature from about 100° to about 200° C. until a reaction product is obtained having a melting point and a viscosity substantially higher than that of the original rosin ester.

6. A method of producing a condensation product of a phenol and a rosin ester which includes heating a rosin ester with a phenol in substantially equimolecular proportions in the presence of para-toluene sulfonic acid at a temperature from about 100° to about 200° C. until a reaction product is obtained having a melting point and a viscosity substantially higher than that of the original rosin ester.

7. A method of producing a condensation product of phenol and a rosin ester which includes heating a rosin ester with phenol in substantially equimolecular proportions in the presence of para-toluene sulfonic acid at a temperature from about 100° to about 200° C. until a reaction product is obtained having a melting point and a viscosity substantially higher than that of the original rosin ester.

8. A method of producing a condensation product of phenol and methyl abietate which includes heating methyl abietate with phenol in substantially equimolecular proportions in the presence of para-toluene sulfonic acid at a temperature from about 100° to about 200° C. until a reaction product is obtained having a melting point and a viscosity substantially higher than that of the original methyl abietate.

9. A method of producing a condensation product of a phenol and glycerol abietate which includes heating the glycerol abietate with a phenol in substantially equimolecular proportions in the presence of an aromatic sulfonic acid at a temperature from about 100° to about 200° C. until a reaction product is obtained having a melting point and a viscosity substantially higher than that of the original glycerol abietate.

10. A method of producing a condensation product of a phenol and glycerol abietate which includes heating the glycerol abietate with a phenol in substantially equimolecular proportions in the presence of para-toluene sulfonic acid at a temperature from about 100° to about 200° C. until a reaction product is obtained having a melting point and a viscosity substantially higher than that of the original glycerol abietate.

11. A method of producing a condensation product of phenol and glycerol abietate which includes heating the glycerol abietate with phenol in substantially equimolecular proportions in the presence of para-toluene sulfonic acid at a temperature from about 100° to about 200° C. until a reaction product is obtained having a melting point and a viscosity substantially higher than that of the original glycerol abietate.

ARTHUR L. OSTERHOF.